UNITED STATES PATENT OFFICE.

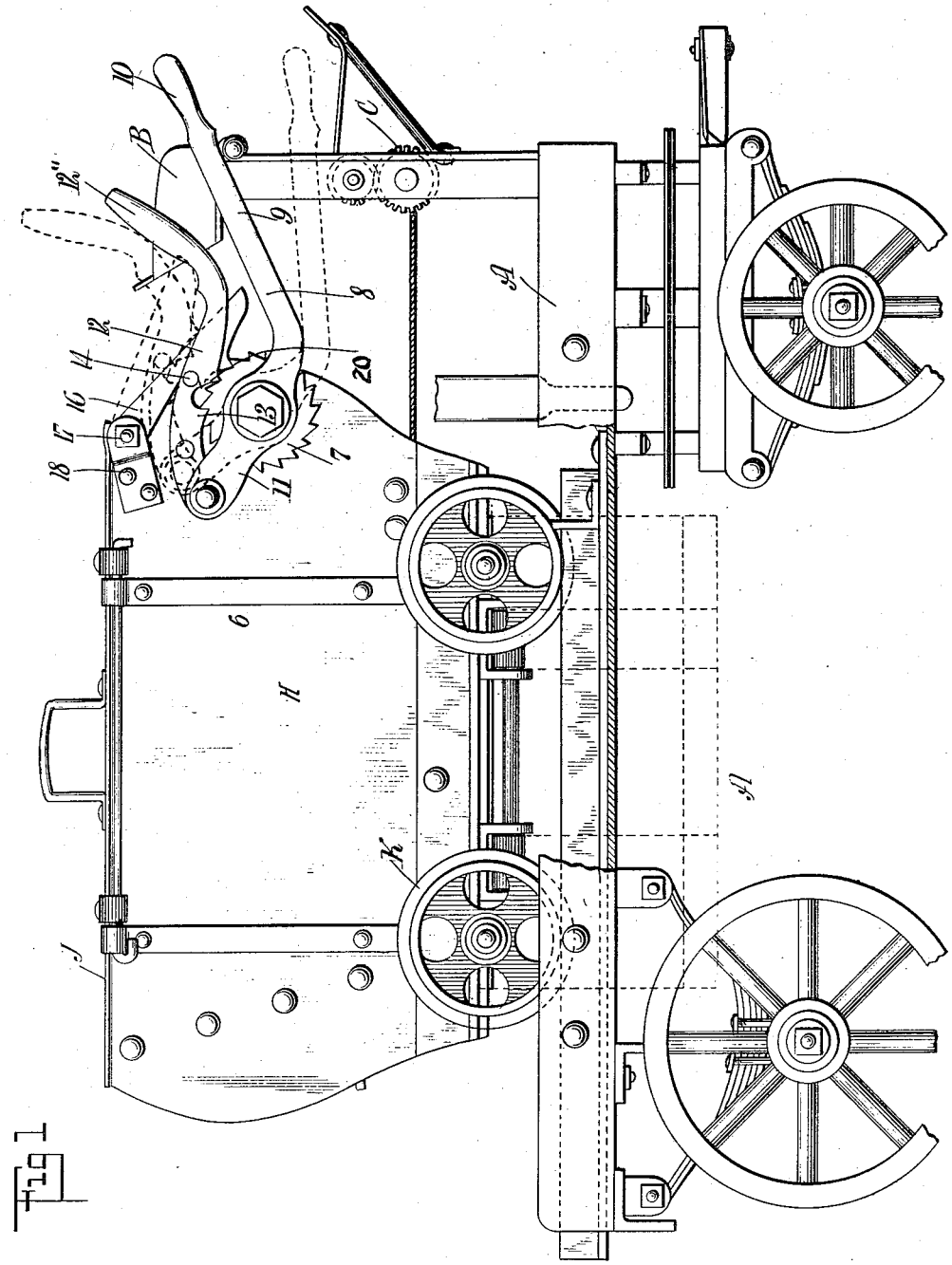

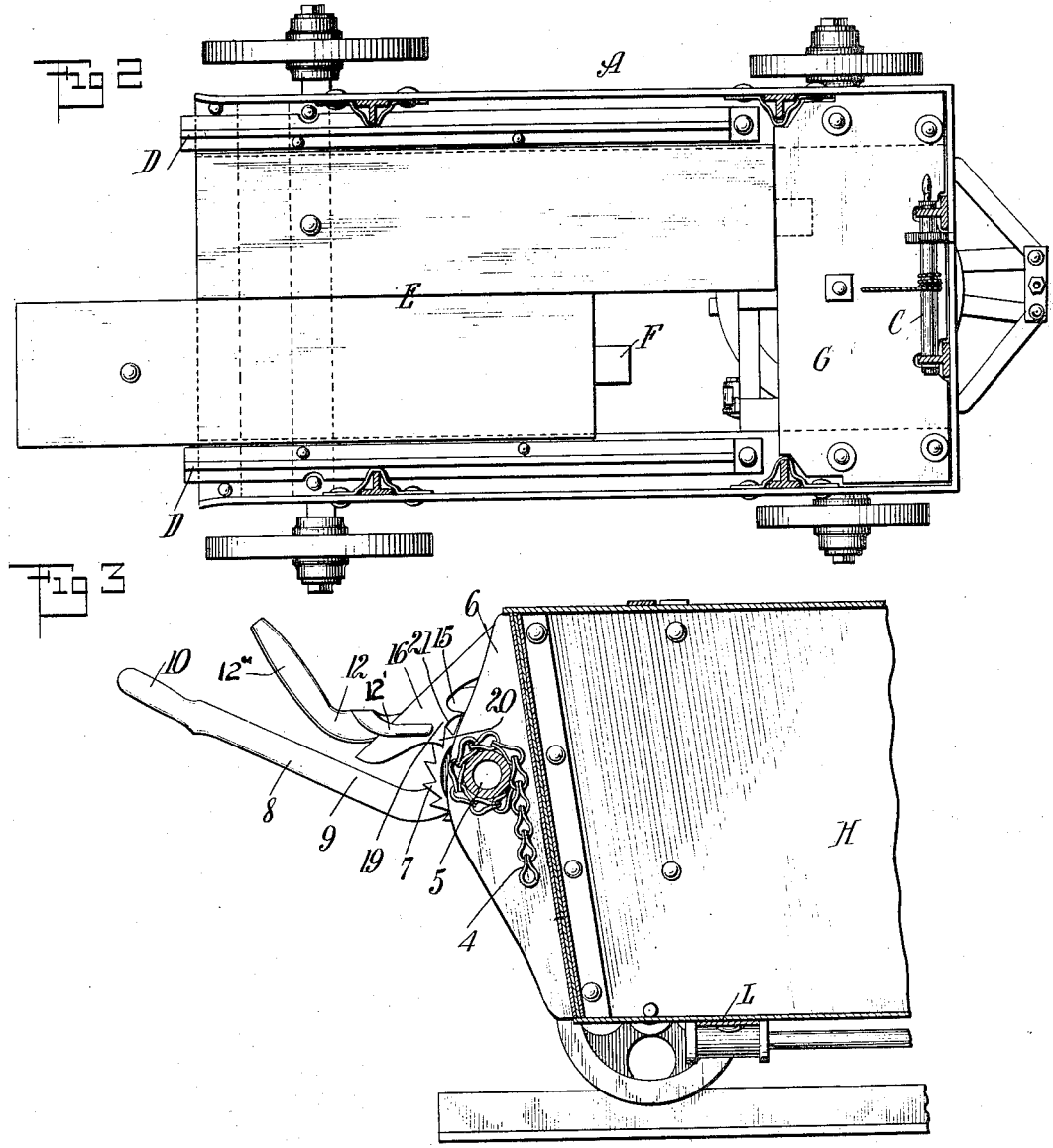

JOSEPH JANUKAYTIS, OF NEW YORK, N. Y.

DUMPING-VEHICLE.

1,036,248.

Specification of Letters Patent.   Patented Aug. 20, 1912.

Application filed December 30, 1911.   Serial No. 668,657.

*To all whom it may concern:*

Be it known that I, JOSEPH JANUKAYTIS, a citizen of the United States, and a resident of the city of New York, borough of Brooklyn, in the county of Kings and State of New York, have invented a new and Improved Dumping-Vehicle, of which the following is a full, clear, and exact description.

My invention relates to a dumping vehicle, particularly adapted for the transportation of asphalt.

An object of my invention is to provide a street truck which may be used as is usual with trucks of this character and which may be converted into an open bottom truck for the discharge of material carried by a cart mounted thereon.

A further object of my invention is to provide a vehicle of the above-indicated character having an improved means for dumping the material from the cart, which means is disposed adjacent the driver's seat.

Reference is to be had to the accompanying drawings, forming a part of this specification, in which similar characters of reference indicate corresponding parts in all the figures, and in which—

Figure 1 is a side elevation of my improved vehicle, parts of the truck being broken away to show the track and showing the dumping mechcanism in two parts; Fig. 2 is a plan view looking down upon the truck shown in Fig. 1 with the cart and part of the flooring removed; and Fig. 3 is a longitudinal vertical sectional view taken through the cart and showing the reverse side of the dumping mechanism to that shown in Fig. 1.

Described more in detail, I have shown a street truck A of any suitable construction, having a driver's seat B extending some material distance up from the front end thereof, mounted below which driver's seat is a hoisting drum C, as is common with devices of this general character. This truck has a pair of parallel longitudinally-extending tracks D, mounted between which tracks is a removable floor E, in this case shown to comprise two planks projecting from the front end of each of which is a lug F adapted to engage beneath a front floor board G, in order to hold the planks in position. It is to be understood that when the device is used as an ordinary truck, these planks will remain in place, but when the device is used as a dumping vehicle, these planks are removed.

Mounted to roll on the tracks D from the flat railroad cars, is a cart H, adapted to be drawn on the track by means of the drum C. This cart H has a cover J, flanged wheels K, and a downwardly-dropping two-part bottom L, which bottom is drawn into closed position by means of a chain connection 4, as is common with devices of this character. One end of the chain 4 passes about a drum 5 extending transversely through the front of side plates 6 of the cart H. Rigidly mounted upon the right-hand side of the drum 5 and on the outside of the adjacent side plate 6, is a one-way ratchet wheel 7, the actuation of which in a clockwise direction, will wind up the chain 4, to close the trap doors forming the bottom L.

Loosely mounted on the drum 5, abutting the ratchet wheel 7, and on the outer side thereof, is an actuating lever 8, the forward arm 9 of which is bent slightly upward and extends forwardly, so that the handle 10 is positioned to one side of and slightly in advance of the driver's seat B.

Pivoted to the rear end of the short arm or rearward extension 11 of the lever 8 is a forwardly-extending feeding arm 12 extending above the lever 8. This arm 12 has a downwardly-extending tooth 13 adapted to fall by gravity into the notches of the wheel 7, to feed said wheel in a clockwise direction when the handle 10 is oscillated over a limited arc of movement by the operator's hand. Slightly in advance of the tooth 13 and projecting inwardly from the feeding arm 12, is a pin 14 adapted to move in a recess 15 in the under side of a pawl 16 pivoted at 17 to a bracket 18 mounted on the adjacent side plate 6. Projecting downwardly from the pawl 16, is a projection 19, one end of which constitutes a hook forming the forward boundary of the recess 15 and which limits the movement of the pin 14 in the recess 15 and the opposite end of which forms a tooth 20 adapted to engage the ratchet wheel 7 in order to hold the same, to prevent it from rotating in a counter-clockwise direction. The curved face 21 of the projection 19 permits the teeth of the ratchet wheel 7 to raise the pawl 16, thereby forming a means by which the trap doors forming the bottom L may be brought into closed position when the handle 10 is oscillated by the driver while seated on the seat B. The doors forming the bottom will drop of their own weight, when the teeth 13 and 20 are disengaged from the ratchet 7.

It will be noted that the forcing of the lever arm 9 downward for a material distance, as shown in dotted lines in Fig. 1, will cause the pin to engage the projection 19, raising the pawl 16 on its pivotal point 17, thereby lifting the tooth 20, to clear the ratchet 7. Simultaneously with this action of the pin, the aforesaid hook will carry the pin upward around the point 17 as a center, causing the tooth 13 to leave the ratchet. By this construction, the oscillation of the arm 9 through a limited arc, will wind up the chain 4, to close the bottom, but an exaggerated downward movement of the arm 9 will unlock the ratchet 7, thereby permitting the doors to automatically open of their own weight, it being noted that the entire operation may be performed by the driver without leaving the seat B.

As shown most clearly in Fig. 3, the feeding arm 12 is provided with a rigid finger 12' which extends across and embraces the pawl 16, and the forward end of the feeding arm 12 is provided with a handle 12''.

In further explanation of the operation of this invention it will be noted that when the lever 8 is oscillated, as above described, by the operator's hand for the purpose of rotating the drum to close the bottom of the cart, the teeth 13 and 20 engage the ratchet wheel as described, but the pawl 16 will not be lifted out of engagement by the pin 14 while the lever is thus being operated under ordinary conditions because the extent of movement of the handle 10 would not be so far downward as to enable or permit the operator while grasping it with his hand to unlock the pawl 16. After the cart bottom has been closed in the manner described, the operator will oscillate the lever 8 both upward and rearward, causing the handle 10 to stand substantially vertical, the feeding arm 12, of course, following the extension 11, bringing the finger 12' substantially into engagement with the upper part of the pawl not far distant from the pivot 17. The tooth 13, however, will be in engagement with one of the teeth of the ratchet wheel, thus holding the lever 8 and feeding arm 12 in the position last described during the transportation of the cart. The purpose of the finger 12', therefore, at this time, is to limit the upward or rearward swing of the lever 8. Another function of said finger, however, is to prevent the accidental displacement of the pawl from the ratchet wheel, as is so common in this class of machinery, due to carelessness and awkwardness of the workmen in the vicinity. When it is desired for the man on the seat B to dump the load, he will grasp the handle 12'', lifting the tooth 13 out of engagement with the ratchet wheel, and thereby swing the lever 8 forward around the axis of the drum until the pin 14 reaches the hook formed at the forward end of the recess 15 in the pawl 16. This position of the lever 8 will bring the handle end of the lever opposite the operator's foot at which time he will kick said handle end with his foot downward, throwing either or both teeth out of engagement with the ratchet wheel and said teeth will so remain out of engagement until the operating levers are returned to the operating position by the operator grasping one or the other of the handles 10 or 12'', preferably the latter.

Having thus described my invention, I claim as new and desire to secure by Letters Patent:

1. A cart having an open bottom, a door adapted to close said bottom, a chain closing said door and holding the latter in closed position, a drum, one end of said chain mounted on said drum, a ratchet wheel rigidly mounted on said drum, a lever loosely mounted on said drum and having an extension beyond the axis of the drum, a feeding arm pivoted to said extension, said feeding arm adapted to engage said ratchet to feed the same in one direction, means carried by the cart engaging the ratchet wheel to prevent it from moving in a counter direction, and means actuated by said lever and feeding arm adapted to disengage said counter-movement-preventing means.

2. In combination with a drum, a ratchet wheel rigidly mounted thereon, a lever loosely mounted on said drum and having an extension beyond the axis of the drum, a feeding arm carried by said lever extension and adapted to feed said ratchet wheel in one direction, a pawl engaging said ratchet wheel to prevent it from moving in a counter direction, and a pin carried by said feeding arm, adapted to engage said pawl, to lift the same out of engagement with said ratchet.

3. In a cart having a hinged bottom, means for actuating said bottom, said means comprising a shaft, a one-way ratchet rigidly mounted on said shaft, an actuating lever pivoted intermediate its length to said shaft, a feeding arm pivoted to one end of said lever engaging said ratchet to feed the same, a pawl engaging said ratchet to prevent the same from turning in a counter-direction, said pawl having a recess in its under side, and a pin carried by said feeding arm movable in said recess out of engagement with the pawl when the actuating lever is moved over a relatively small arc in rotating the ratchet, said pin contacting with the pawl to disengage the same from the ratchet when the actuating lever is moved over a relatively large arc.

4. The combination of a shaft, a ratchet wheel fixed to the shaft to control the rotation thereof, a lever pivoted intermediate its ends on the shaft, a feeding arm connected to one end of the lever and having a tooth adapted to engage and turn the ratchet wheel, a pawl having a tooth to engage and prevent backward movement of the ratchet wheel, a pin carried by the feeding arm, said pawl having a hook adapted to be engaged by said pin, and a finger carried by the feeding arm and embracing said pawl on the side thereof opposite the pin, for the purposes set forth.

In testimony whereof I have signed my name to this specification in the presence of two subscribing witnesses.

JOSEPH JANUKAYTIS.

Witnesses:
JOSEPH J. PERKINS,
WILLIAM YOUNG.